United States Patent
Goodson et al.

(10) Patent No.: US 9,432,169 B2
(45) Date of Patent: Aug. 30, 2016

(54) SYSTEMS AND METHODS FOR POWER OPTIMIZED FRAMING

(71) Applicants: Richard L. Goodson, Huntsville, AL (US); Fred Chu, Madison, AL (US); Martin Kuipers, Dallgow-Doberitz (DE)

(72) Inventors: Richard L. Goodson, Huntsville, AL (US); Fred Chu, Madison, AL (US); Martin Kuipers, Dallgow-Doberitz (DE)

(73) Assignee: ADTRAN, Inc., Huntsville, AL (US)

( * ) Notice: Subject to any disclaimer, the term of this patent is extended or adjusted under 35 U.S.C. 154(b) by 50 days.

(21) Appl. No.: 13/971,823

(22) Filed: Aug. 20, 2013

(65) Prior Publication Data

US 2014/0050227 A1  Feb. 20, 2014

Related U.S. Application Data

(60) Provisional application No. 61/691,128, filed on Aug. 20, 2012.

(51) Int. Cl.

| | |
|---|---|
| *H04L 12/28* | (2006.01) |
| *H04L 5/00* | (2006.01) |
| *H04B 3/04* | (2006.01) |
| *H04M 11/06* | (2006.01) |
| *H04B 3/32* | (2006.01) |

(52) U.S. Cl.
CPC .............. *H04L 5/0058* (2013.01); *H04B 3/04* (2013.01); *H04M 11/062* (2013.01); *H04B 3/32* (2013.01)

(58) Field of Classification Search
USPC ................ 370/442, 314, 318, 329, 330, 321
See application file for complete search history.

(56) References Cited

U.S. PATENT DOCUMENTS

| | | | |
|---|---|---|---|
| 6,934,267 B1 | 8/2005 | Mannerstrale | |
| 7,760,624 B1 | 7/2010 | Goodson et al. | |
| 7,929,498 B2 | 4/2011 | Ozluturk et al. | |
| 2003/0157955 A1* | 8/2003 | Jarvisalo et al. | ............. 455/522 |
| 2004/0085940 A1* | 5/2004 | Black et al. | .................. 370/337 |
| 2005/0213714 A1 | 9/2005 | Langberg et al. | |
| 2013/0208579 A1* | 8/2013 | Strobel | ................... H04B 3/32 370/201 |

FOREIGN PATENT DOCUMENTS

EP   2073567   6/2009

OTHER PUBLICATIONS

International Search Report and Written Opinion issued by the United States Patent and Trademark Office as the International Searching Authority for International Application No. PCT/US2013/055891, entitled Systems and Methods for Power Optimized Framing; Thomas, Shane (Nov. 22, 2013).

* cited by examiner

*Primary Examiner* — Zewdu A Beyen
(74) *Attorney, Agent, or Firm* — Maynard Cooper & Gale, P.C.; Jon E. Holland

(57) ABSTRACT

Power dissipation within a network service unit, such as digital-subscriber-line access multiplexer (DSLAM), is treated as a resource that is to be shared among subscribers. In this regard, the total amount of available power dissipation is quantified, and the framing for the data streams communicated across the subscriber lines are controlled to ensure that specified power dissipation limits are not exceeded, accounting for one or more factors, such as traffic load, service level agreement (SLA) specifications, available power, and temperature.

21 Claims, 9 Drawing Sheets

Frame 1: | TS 1 | TS 2 | TS 3 | TS 4 | TS 5 | ST | TS 6 | TS 7 | TS 8 | TS 9 | TS 10 | ST |

Frame 2: | TS 1 | TS 2 | TS 3 | TS 4 | TS 5 | ST | TS 6 | TS 7 | TS 8 | TS 9 | TS 10 | ST |

FIG. 3

SYSTEMS AND METHODS FOR POWER OPTIMIZED FRAMING

CROSS REFERENCE TO RELATED APPLICATION

This application claims priority to U.S. Provisional Patent Application No. 61/691,128, entitled "Power Optimized Framing," and filed on Aug. 20, 2012, which is incorporated herein by reference.

RELATED ART

In a telecommunication system, a network service unit often resides at an intermediate point, such as a distribution point (DP), between one or more customer premises (CP) and a network facility, such as a central office (CO). On the network side, the service unit is typically connected to at least one network connection, such as an optical fiber, extending from a network facility. On the CP side, the service unit is typically connected to a plurality of subscriber lines servicing one or more customer premises, and the service unit provides a network interface for the CP traffic. In a digital-subscriber-line (DSL) architecture, such a service unit is sometimes referred to as a DSL access multiplexer or "DSLAM."

A network service unit can be deployed in an outside plant environment at any of various points between customer premises equipment (CPE) and a network facility. Thus, a network service unit often has an environmentally-hardened housing in which the electrical components of the service unit are situated. Such housings are typically composed of thermally conductive materials and have power sinking features, such as fins, incorporated into their designs in an effort to remove heat from the electrical components within the housing. However, under some conditions, temperatures within the housing approach or exceed desired temperature limits, particularly in warm climates, resulting in performance issues and sometimes damage to the circuitry within the housing.

In addition, network service units are often deployed at remote locations where power supplies are not readily available. In such cases, the service unit may be equipped with a battery and/or receive a limited amount of power from a network connection or subscriber line. Optimizing the power consumed by the service unit is generally desirable to help ensure that its power requirements are satisfied in addition to keeping the unit's internal temperatures within a safe operating range.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 3 is a block diagram illustrating exemplary consecutive frames.

DETAILED DESCRIPTION

The present disclosure generally pertains to systems and methods for power optimized framing. In one exemplary embodiment, power dissipation within a network service unit is treated as a resource that is to be shared among subscribers. In this regard, the total amount of available power dissipation is quantified, and the framing for the data streams communicated across the subscriber lines are controlled to ensure that specified power dissipation limits are not exceeded, accounting for one or more factors, such as traffic load, service level agreement (SLA) specifications, available power, and temperature.

For example, for a given frame, the available power dissipation may be first distributed among the active subscribers, and then for each active subscriber further divided into downstream and upstream timeslots. The power distribution is performed such that over a sliding window of a specified time interval, the average power dissipation remains below a specified limit. Over a shorter time period, however, large amounts of data can be transferred thus exhibiting a high peak power dissipation during that interval. Such an algorithm for controlling power dissipation allows for high peak power dissipation and corresponding high peak data rates, while simultaneously enforcing a low average power dissipation below a specified limit. The algorithm also allows individual subscribers to use more power when other subscribers are idle or have little data to transfer. In addition, the algorithm allows power dissipation to dynamically move between downstream dominated and upstream dominated, depending on traffic load, while maintaining a low average power dissipation.

Figure 1:
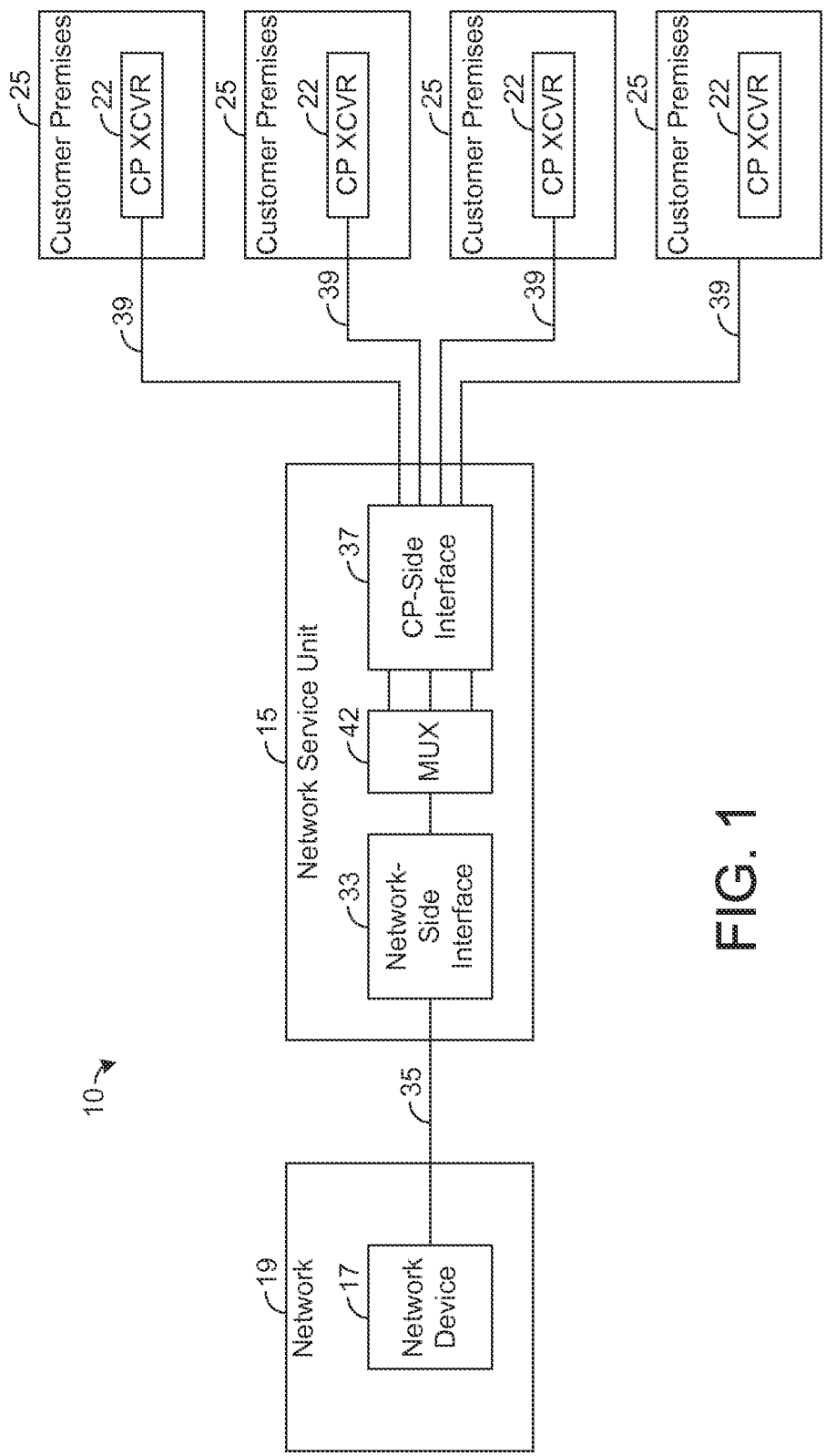
FIG. 1 is a block diagram illustrating an exemplary embodiment of a telecommunication system.

FIG. 1 depicts an exemplary embodiment of a telecommunication system 10 having a network service unit 15 coupled between at least one network device 17 of a network 19 and at least one CP transceiver (XCVR) 22 at one or more customer premises 25. As an example, the network device 17 may reside at a central office or some other facility of the network 19, and the network service unit 15 may reside at a distribution point or some other intermediate point between the network 19 and the customer premises 25. In other embodiments, other locations of the network device 17 and the network service unit 15 are possible, and the network service unit 15 may be used to service any number of CP transceivers 22. Further, the same subscriber may utilize any number of CP transceivers 22.

As shown by FIG. 1, the network service unit 15 has a network-side interface 33 that is coupled to the network device 17 via a network connection 35. In one exemplary embodiment, the network connection 35 comprises an optical fiber, but other types of communication media may be used in other embodiments, such as one or more twisted-wire pairs.

The network service unit 15 also comprises a CP-side interface 37 that is coupled to the CP transceivers 22 by a plurality of subscriber lines 39, respectively. In one exemplary embodiment, each subscriber line 39 is implemented as a twisted-wire pair, but other types of communication media, such as optical fiber, are possible in other embodiments. Using twisted-wire pairs for the subscriber lines 39 has the advantage of leveraging existing copper infrastructure for at least the segment between the network service unit 15 and the customer premises 25. Although conductive connections, such as twisted-wire pairs, generally do not permit data rates as high as other media, such as optical fiber, across long distances, the distances between intermediate points (e.g., DPs) and the customer premises 25 are relatively short. Also, the traffic communicated across the network connection 35 may be distributed across multiple subscriber lines 39 such that it is not necessary for each subscriber line 39 to support the same peak data rates that are supported by the network connection 35. In this regard, the network service unit 15 comprises a multiplexer (MUX) 42 that is configured to multiplex the high-speed data stream from the network connection 35 across multiple subscriber lines 39, as will be described in more detail hereafter. In the opposite direction, the MUX 42 combines the data streams from the subscriber lines 39 into a single, high-speed data stream for communication across the network connection 35.

Various communication protocols and formats may be used for the communication across the subscriber lines 39 and the network connection 35. In one exemplary embodiment, the network connection 35 is implemented as an optical fiber, and an optical format in accordance with GPON or GbE is used for communication across the network connection 35. In addition, a DSL protocol such asymmetric DSL (ADSL), high-bit-rate DSL (HDSL), HDSL2, very-high-bit-rate DSL (VDSL), fast access subscriber terminals (FAST), or other known DSL protocol is used for the communication across the subscriber lines 39. However, it should be emphasized that other protocols are possible in other embodiments.

Figure 2:
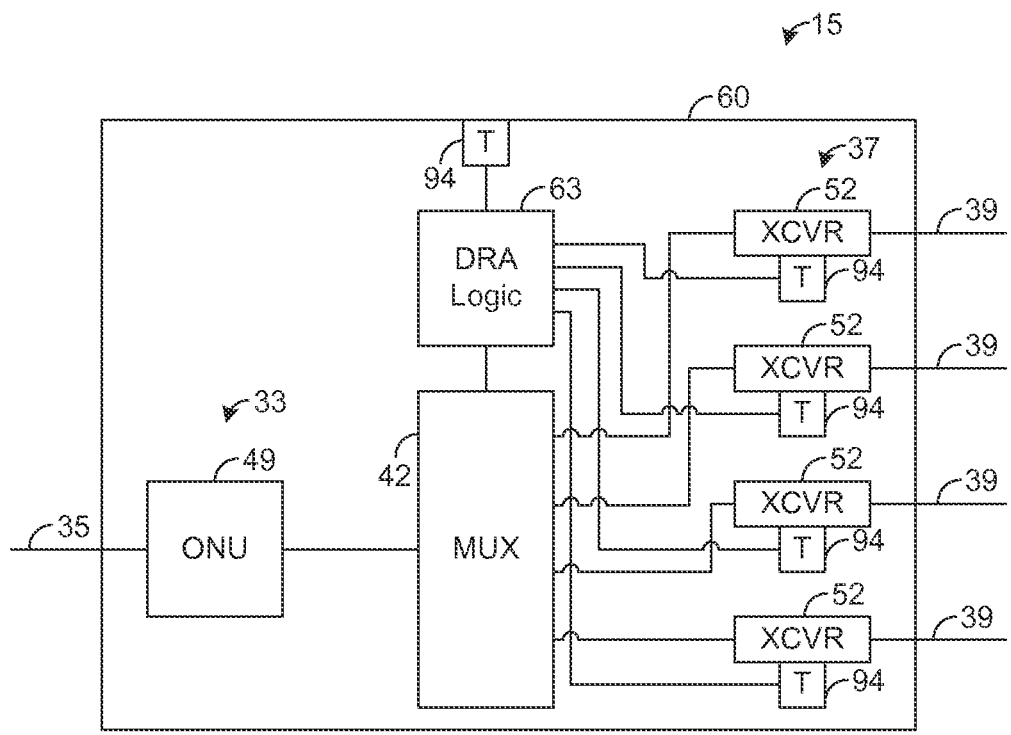
FIG. 2 is a block diagram illustrating an exemplary embodiment of a network service unit, such as is depicted by FIG. 1.

FIG. 2 depicts an exemplary embodiment of the network service unit 15. For the exemplary unit 15 depicted by FIG. 2, the network-side interface 33 is implemented via an optical network unit (ONU) 49 that is coupled to the network connection 35, which is implemented as an optical fiber in this embodiment. In such embodiment, the network device 17 (FIG. 1) may comprise an optical line terminal (OLT) coupled to the network connection 35 at the opposite end of the connection 35. As shown by FIG. 2, the CP-side interface 37 is implemented via a plurality of transceivers (XCVRs) 52 that are respectively coupled to the subscriber lines 39.

In the downstream direction, the network device 17 transmits a high-speed data stream having packets destined for various CP transceivers 22 across the network connection 35 to the ONU 49. The ONU 49 converts the data stream from the optical domain to the electrical domain and electrically transmits the data stream to the multiplexer 42. The multiplexer 42 multiplexes the packets within the received data stream such that each packet is transmitted to the appropriate transceiver 52 for communication across the appropriate subscriber line 39 to the CP transceiver 22 to which the packet is destined. As known in the art, the multiplexer 42 may be have a forwarding table (not shown) or other data for indicating which transceiver 52 is to transmit each packet based on control information contained in the packet's header. Using such information, the multiplexer 42 identifies which transceiver 52 is to transmit a given packet and forwards the packet to such transceiver 52. The transceiver 52 then modulates a carrier signal with the data to form a data signal that is transmitted across the subscriber line 39 that is coupled to the transceiver 52.

In the upstream direction, each CP transceiver 22 transmits a data signal across its respective subscriber line 39 to the transceiver 52 of the service unit 15 that is coupled to such subscriber line 39. The transceiver 52 demodulates the data signal to recover a data stream, and the multiplexer 42 combines the streams from multiple subscriber lines 39 into a single, high-speed data stream. The ONU 49 converts such high-speed data stream from the electrical domain to the optical domain for transmission across the network connection 35 to the network device 17 (FIG. 1).

Note that the electrical components of the service unit 15 shown by FIG. 2 are situated in an environmentally-hardened housing 60 for protecting the electrical components from environmental conditions, such as rain, dust, etc. In this regard, the housing 60 preferably encloses the electrical components and is sealed to prevent water and particles from entering the housing 60. The housing 60 is preferably composed of thermally conductive materials that are in contact with the electrical components in an effort to draw heat away from such components.

As shown by FIG. 2, the network service unit 15 comprises dynamic rate allocation (DRA) logic 63 that is configured to dynamically control framing for the communication occurring across the subscriber lines 39, as will be described in more detail below. In one exemplary embodiment, the framing implements a time division duplex (TDD) architecture where both upstream and downstream communication occurs in the same frequency range but are separated in time in order to prevent data collisions.

For illustrative purposes, FIG. 3 depicts two consecutive frames for communication occurring across a subscriber line 39. Each frame is divided into a number of timeslots (TS) that can be allocated by the DRA logic 63 for either downstream transmission or upstream transmission. In the exemplary frames shown by FIG. 3, each frame is divided into ten timeslots for simplicity of illustration, but the frames may have any number of timeslots in other embodiments.

The DRA logic 63 may allocate a timeslot of a given frame for active downstream transmission (represented as "D" in subsequent figures) or active upstream transmission (represented as "U" in subsequent figures). When a timeslot is allocated for active downstream transmission, downstream data may be transmitted during the timeslot by the service unit transceiver 52 that is coupled to the subscriber line 39 that carries the data. However, the CP transceiver 22 may not transmit upstream data during the timeslot. When a timeslot is allocated for upstream transmission, upstream data may be transmitted during the timeslot by the CP transceiver 22 that is coupled to the subscriber line 39 that carries the data. However, the service unit transceiver 52 may not transmit downstream data during the timeslot. A timeslot will be referred to hereafter as "active" when data is or is to be actively transmitted in the timeslot.

In an effort to optimize communication efficiency, the timeslots allocated for upstream communication are grouped together and the timeslots allocated for downstream communication are grouped together so that there is only one transition from downstream communication to upstream communication per frame. In addition, to mitigate crosstalk, upstream and downstream groups from one subscriber line 39 to the next are synchronized in order to prevent one subscriber line 39 from carrying upstream data while another subscriber line 39 is carrying downstream data. That is, each frame is segmented into a downstream group, referred to herein as "downstream block," and an upstream group, referred to herein as "upstream block," and each timeslot is assigned to a respective one such block. Further, for each frame, the downstream block occurs at the same time (i.e., overlaps in time) for each subscriber line 39, and the upstream block occurs at the same time (i.e., overlaps in time) for each subscriber line 39.

Note that between consecutive upstream and downstream blocks is a switching time (ST) period where the service unit transceiver 52 and CP transceiver 22 are not permitted to actively transmit across the subscriber line 39. The ST period is preferably of sufficient length to ensure that the data transmitted in the last timeslot of a given upstream or downstream block propagates across the subscriber line 39 and is received at the far end of the line 39 before the transceiver (22 or 52, depending on the direction of transmission) at the far end of the line 39 is permitted to transmit in the opposite direction. Permitting only one downstream block and one upstream block per frame minimizes the number of these ST periods thereby increasing the amount of time that is available for active transmissions.

The DRA logic 63 is configured to communicate with each CP transceiver 22 via a control channel so that the DRA logic 63 may inform each CP transceiver 22 of its timeslot allocation for each frame. As will be described in more detail hereafter, the DRA logic 63 dynamically allocates the timeslots based on various factors, such as traffic load and temperature, and informs each transceiver 22 and 52 of the timeslots that have been allocated to it. As an example, the DRA logic 63 may define a media access plan (MAP) and communicate such MAP to each transceiver 22 and 52 as is done in conventional TDD systems in order to control timeslot allocations.

If desired, the control channel may be provided separate from the subscriber lines 39, such as a dedicated line (not shown) for transmitting control information between the service unit 15 and the CP transceivers 22. In one exemplary embodiment, the control channel is embedded in the data streams transmitted across the subscriber lines 39. As an example, the DRA logic 63 may allocate some downstream and upstream timeslots for control information. The DRA logic 63 may use the downstream timeslots allocated for control information in order to transmit the MAP described above to the CP transceivers 22. The CP transceivers 22 may use the upstream timeslots allocated for control information in order to provide various control information, such as traffic load at the CP transceivers 22. For example, a CP transceiver 22 may provide a value indicative of the amount of data that the CP transceiver 22 currently has queued for transmission across its respective subscriber line 39. The DRA logic 63 may similarly receive from each service unit transceiver 52 a value indicative of the amount of data the service unit transceiver 52 currently has queued for transmission across its respective subscriber line 39. Thus, the DRA logic 63 has information indicating the traffic load conditions at each transceiver 22 and 52 and uses such information in order to make timeslot allocation decisions, as will be described in more detail hereafter.

Note that the DRA logic 63 can be implemented in software, hardware, firmware or any combination thereof. In one exemplary embodiment illustrated by FIG. 4, the DRA logic 63 is implemented in software and stored in memory 71 of a controller 73. Note that the DRA logic 63, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

Figure 4:
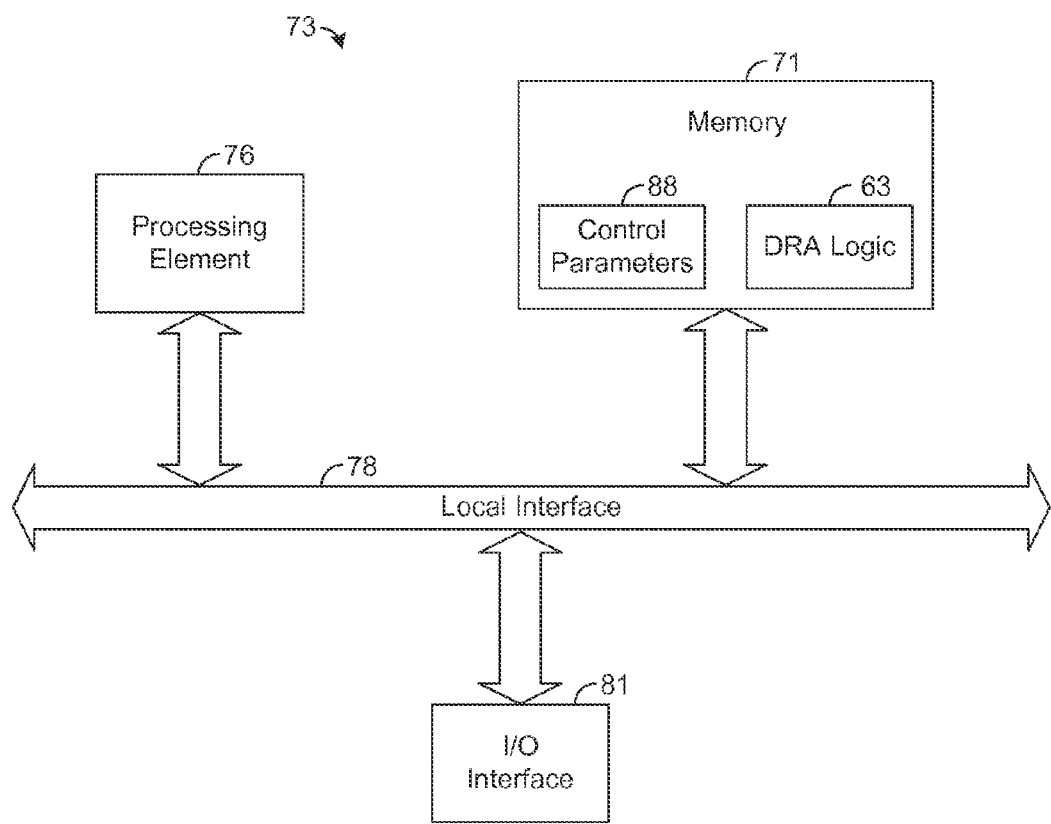
FIG. 4 is a block diagram illustrating an exemplary embodiment of a controller having dynamic rate allocation logic implemented in software.

The controller 73 depicted by FIG. 4 comprises at least one conventional processing element 76, such as a digital signal processor (DSP) or a central processing unit (CPU), that communicates to and drives the other elements within the controller 73 via a local interface 78, which can include at least one bus. Furthermore, an input/output (I/O) interface 81 enables the DRA logic 63 to communicate with components external to the controller 73 shown by FIG. 4.

The DRA logic 63 is configured to control timeslot allocation in order to ensure that the average power dissipation during a specified time interval does not exceed a threshold, referred to hereafter as $TH_P$. Such threshold $TH_P$ can be set based on various factors. As an example, the threshold can be set to ensure that the power consumed by the service unit 15 does not exceed the power that is available for consumption. Alternatively, the threshold can be set to ensure that operating temperatures within the service unit 15 remain within a desired range in an effort to prevent overheating conditions within the unit 15. Other reasons for controlling power dissipation are possible.

The DRA logic 63 is preferably configured to dynamically adjust the timeslot allocations in an effort to optimize the framing structure in order to efficiently and fairly share the available power dissipation across a plurality of subscribers. In one exemplary embodiment, the DRA logic 63 uses principles similar to known max-min fairness or other similar algorithms to assign timeslots in an efficient and fair manner when power dissipation constraints and traffic demand cause congestion.

In this regard, each subscriber serviced by the unit 15 is assigned a weight, and the DRA logic 63 allocates available power (which can be limited by the power constraints described herein) among the subscribers based on the respective weights assigned to the subscribers. For instance, if each subscriber has a backlog of traffic to be transmitted for a given frame, the DRA logic 63 may allocate more power for transmission/reception to subscribers that are assigned a higher weight and less power for transmission/reception to subscribers that are assigned a lower weight. Thus, a subscriber assigned a higher weight may be allowed to dissipate more power during a frame.

Once the DRA logic 63 has established an amount of power that a subscriber is allowed to dissipate in a given frame, the DRA logic 63 allocates timeslots for the subscriber based on the subscriber's power limit for the frame. For example, the DRA logic 63 may allocate to the subscriber as many active upstream and/or downstream timeslots as is possible within the framing structure without exceeding the subscriber's power limit for the frame. In this regard, each active timeslot within a frame causes a certain amount of power dissipation at the service unit transceiver 52 that processes the data communicated in the timeslot, and the DRA logic 63 ensures that the sum of the power dissipated by the transceiver 52 servicing a particular subscriber does not exceed the power limit specified for the subscriber. Thus, for a given frame, the total number of active timeslots allocated to a subscriber is based on and, specifically, limited by the power limit assigned to the subscriber for the frame. Moreover, for a given frame, a subscriber assigned a higher weight may be allocated a higher dissipation and, hence, more timeslots relative to a subscriber assigned a lower weight. However, as will be described in more detail, there may be exceptions based on traffic demand and other factors.

In one exemplary embodiment, the memory stores 71 stores control parameters 88 (FIG. 4) that the DRA logic 63 uses to allocate timeslots. As an example, the control parameters 88 may indicate the weights assigned to the subscribers serviced by the unit 15. Such parameters 88 are preferably provisioned by a technician or other user based on the respective SLAs for the subscribers and/or other factors.

Note that the service unit 15 has a plurality of ports that are respectively coupled to the subscriber lines 39. Each port has an identifier, referred to as "port identifier," identifying the port and, hence, the subscriber line 39 to which the port is coupled. The control parameters 88 may associate the weights with port identifiers to indicate which port and, hence, subscriber line 39 is associated with a respective weight. Identifying the port that is used to service a subscriber has the effect of identifying the subscriber line 39 and the transceiver 52 that are coupled to the port. In the context of this document, indicating that power is allocated to a particular subscriber has the same meaning as allocating the power to the transceiver 52 that is used to service the subscriber. That is, when a power unit is described herein as being allocated to a subscriber, the transceiver 52 coupled to the line 39 associated with the subscriber is permitted to dissipate an amount of power up to the value of the allocated power unit. In other words, the power unit is allocated to such transceiver 52, which has the effect of increasing the number of upstream and/or downstream timeslots processed by the transceiver 52.

The DRA logic 63 preferably optimizes the power distribution among subscribers in order to account for traffic load and other factors. For example, assume that a subscriber having a relatively high weight does not have enough data queued for transmission in order to utilize each timeslot that would otherwise be allocated to the subscriber based on the respective subscriber weights. In such case, the DRA logic 63 may be configured to allocate less power and, therefore, assign fewer timeslots to the subscriber, thereby decreasing the number of timeslots allocated to the subscriber for a given frame and increasing the number of timeslots allocated to one or more other subscribers that have a backlog of data queued for transmission. Exemplary timeslot allocation algorithms will be described in more detail below.

In addition, the DRA logic 63 is configured to adjust the power dissipation constraints over time based various runtime factors such that the power dissipation and, hence, total number of timeslots allocated for active transmissions can change from one frame to the next. In one exemplary embodiment, such adjustments are based on temperature. In this regard, as shown by FIG. 2, the service unit 15 has at least one temperature sensor 94 for sensing a temperature of the unit 15. For example, in FIG. 2, a respective temperature sensor 94 is coupled to each transceiver 52 for measuring a temperature of the transceiver 52 to which it is coupled. A temperature sensor 94 may be coupled to the housing 60 for measuring a temperature of the housing 60 or the ambient temperature external to the housing. A temperature sensor 94 may be coupled to any component of the service unit 15 in other embodiments.

The DRA logic 63 is configured to monitor the temperature measurements from at least one temperature sensor 94. If the sensed temperature exceeds a predefined upper temperature threshold, the DRA logic 63 is configured to reduce the power limit (e.g., $TH_P$) so that the average power dissipation decreases. That is, the DRA logic 63 is configured to reduce the power limit such that, on average, the amount of power allocated to each frame is less, thereby resulting in fewer active timeslots per frame on average. Thus, when the measured temperature reaches a specified level, the average power dissipated by the service unit 15 is reduced in an effort to keep the temperature within a desired operating range.

Once the sensed temperature falls below a predefined lower temperature threshold, the DRA logic 63 is configured to increase the power limit (e.g., $TH_P$) so that, on average, the amount of power allocated to each frame is greater, thereby resulting in a higher number of active timeslots per frame on average. Accordingly, the power dissipation limit can be increased during times of relatively low temperature in order to permit higher data rates, and the power dissipation limit can be later decreased as temperature rises in order to prevent overheating conditions within the service unit 15. Thus, the allowed power dissipation is optimized based on temperature in order to allow higher data rates when conditions permit such increases while ensuring that the data rate increases do not result in overheating conditions within the service unit 15.

Figure 5:
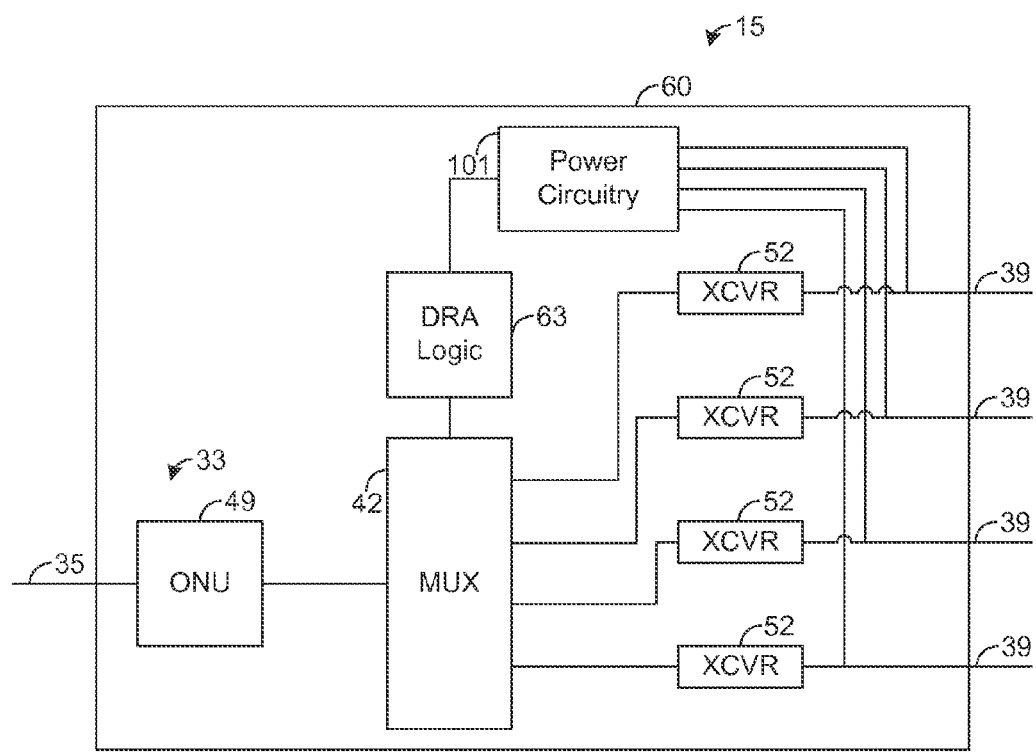
FIG. 5 is a block diagram illustrating an exemplary embodiment of a network service unit, such as is depicted by FIG. 1.

In other embodiments, the power dissipation can be similarly optimized based on other conditions and factors, such as power availability. FIG. 5 shows an exemplary embodiment of a service unit 15 having power circuitry 101 coupled to a plurality of subscriber lines 39. The power circuitry 101 is configured to receive at least one power signal from at least one subscriber line 39 and/or other external source and to harness power from such signals in order to provide electrical power to at least one component of the service unit 15. The power circuitry 101 may aggregate power from multiple subscriber lines 39. The power circuitry 101 may also use such power to provide a conditioned and regulated a power signal for use in powering components of the service unit 15. Exemplary techniques for powering a service unit from power signals transmitted across subscriber lines 39 are described in commonly-assigned U.S. patent application Ser. No. 12/839,403, entitled "Systems and Methods for Powering a Service Unit" and filed on Jul. 19, 2010, which is incorporated herein by reference.

The power circuitry 101 is configured to transmit to the DRA logic 63 information indicative of an amount of power received from the subscriber lines 39 and other external sources, if any. As an example, the power circuitry 101 may be configured to sense an amount (e.g., voltage and/or current) of electrical power received from the subscriber lines 39 and provide a value indicative of such sensed amount. In another embodiment, the power circuitry 101 may determine a number of subscriber lines 39 that are actively providing power above a predefined threshold and inform the DRA logic 63 of such number. Based on this number, the DRA logic 63 may estimate the amount of electrical power received. Alternatively, the number of subscriber lines 39 expected to provide power may be provisioned into the control parameters 88 (FIG. 4). In other embodiments, other types of information indicative of the amount of electrical power received from external sources or otherwise available for use in the service unit 15 are possible.

Based on the information indicative of the total power available, the DRA logic 63 is configured to determine a power dissipation limit for ensuring that the power dissipated by the service unit 15 is less than the amount of power available. As an example, the DRA logic 63 may adjust the power limit (e.g., $TH_P$) based on the information from the power circuitry 101. Thus, the DRA logic 63 is configured to control the number of timeslots in each frame allocated for active transmission in order to ensure that the average power dissipated over a given time interval is less than the average power available during such time interval.

Note that there are various approaches that can be used to ensure that average power dissipated remains below a specified power limit (e.g., $TH_P$). For example, the DRA logic 63 may be configured to maintain the same per-frame power limit for all of the frames. In another embodiment, the DRA logic 63 is configured to change the power limit per frame but to ensure that the power limits are selected such that, over a predefined time interval spanning multiple frames, the average power dissipated does not exceed the power limit (e.g., $TH_P$). This has the effect of allowing peak data rates during certain times, such as periods of high congestion, while ensuring that the data rates are reduced during other time periods in order to ensure that the specified power constraint over time is not violated.

Specifically, during a frame for which there is a relatively large amount of data queued for transmission across the subscriber lines 39, the DRA logic 63 may be configured to specify a relatively high power limit and, hence, allocate a relatively large number of active timeslots, thereby increasing the data rate for such frame. Such power limit may be sufficiently high such that, if the same power limit is used for all frames, then the power constraint could be violated. However, over a specified time interval inclusive of such frame, the DRA logic 63 is configured to allocate a lower power limit for one or more frames to ensure that the average power actually dissipated during the time interval is less than the specified power constraint (e.g., $TH_P$). Thus, in effect, the DRA logic 63 defines a sliding window of a specified duration across the frames and ensures that the total power dissipated during the window is sufficiently low to ensure that the power constraint is not violated while allowing some of the frames to have a relatively high power dissipation limit.

Note that the power limits described herein may be specified in a variety of ways. For example, a power limit may be a predefined value that is stored in memory and provisioned by a technician or other user. Alternatively, a power limit may be calculated by the DRA logic 63 or other component based on one or more factors, such as temperature. In other embodiments, other techniques for specifying a power limit are possible.

It should be further noted that the DRA logic 63 may adjust the sizes of the upstream and downstream blocks based on traffic load or other factors. For example, when a relatively large amount of traffic is queued at the CP transceivers 22, the DRA logic 63 may increase the upstream block, thereby increasing the total number of timeslots available for upstream transmissions, and decrease the downstream block by a corresponding amount, thereby decreasing the total number of timeslots available for downstream transmissions. Conversely, when a relatively large amount of traffic is queued at the service unit transceivers 52, the DRA logic 63 may increase the downstream block, thereby increasing the total number of timeslots available for downstream transmissions, and decrease the upstream block by a corresponding amount, thereby decreasing the total number of timeslots available for upstream transmissions.

An algorithm for ensuring that the power constraint is not violated may take into account frame-to-frame changes in the relative numbers of active upstream and downstream slots. In this regard, each service unit transceiver 52 likely dissipates a different amount of power to transmit data in a downstream timeslot relative to receiving data in an upstream timeslot. Thus, even if the total number of active timeslots are the same for any two given frames, the total power dissipated by a service unit transceiver 52 is likely different for each frame if the ratio of active upstream timeslots to active downstream slots is different. In one exemplary embodiment, the DRA logic 63 takes into account differences in such ratios from one frame to the next in order to ensure that the power constraint is not exceeded.

For example, the control parameters 88 (FIG. 4) may be provisioned in order to indicate the amount of power dissipated by each transceiver 52 to transmit data in a downstream timeslot and the amount of power dissipated by each transceiver 52 to receive data in an upstream timeslot. The control parameters may also be configured to indicate the total amount of power dissipated by the other components (e.g., ONU 49 and multiplexer 42) of the service unit 15 over a given time interval, noting that such power dissipation may be treated as a constant. The DRA logic 63 uses such information to ensure that the defined power limit is not violated over time.

For example, the DRA logic 63 may determine the total power dissipated so far by the service unit 15 for a given window of time, noting that the amount of power dissipated in a frame is based on the number of active upstream timeslots in the frame and the number of active downstream timeslots in the frame. Specifically, the DRA logic 63 may sum three power values to determine the total power dissipated for a given frame. One power value is a predefined constant representing the power dissipated by the common components of the unit 15 (i.e., components other than transceivers 52), such as the ONU 49 (FIG. 2) and the multiplexer 42, during the frame. Another value is a variable downstream power value representing the power dissipated by the transceivers 52 in transmitting downstream, which is a function of the total number of active downstream timeslots in the frame. The last value is a variable upstream power value representing the power dissipated by the transceivers 52 in receiving upstream, which is a function of the total number of active upstream timeslots in the frame.

After determining the total power dissipated so far in a window, the DRA logic 63 may calculate the amount of power that may be dissipated in the remaining portion of the window in order to ensure that the average power dissipated in the window does not exceed the power limit (e.g., $TH_P$). Such analysis takes into account the amount of power dissipated for each active timeslot, which is different depending on whether the active timeslot is for upstream or downstream.

Note that various modifications to the above-described algorithm. For example, since power value for the common components can be treated as a constant, it is possible to omit this value from the analysis and determine value indicative of the total power dissipated by the transceivers 52. In such an embodiment, a lower power limit may be used to account for the fact that the value representing the common components is not summed. Yet other modifications are possible.

To help illustrate some of the foregoing concepts, several specific examples of techniques and algorithms for ensuring that the average power dissipated over a defined time interval remains below a specified power constraint.

Figure 6:
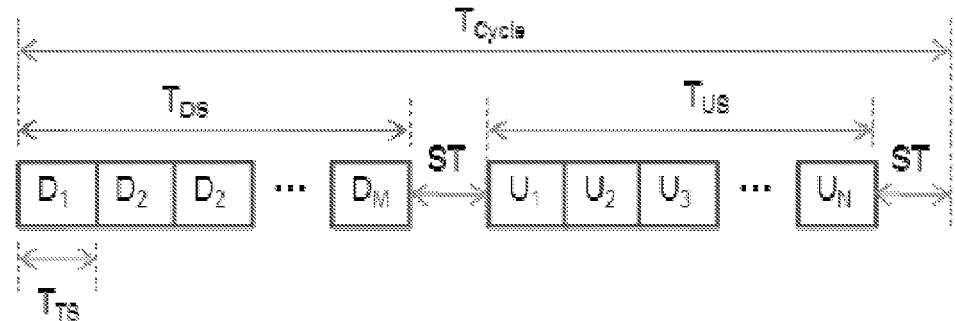
FIG. 6 is a block diagram illustrating an exemplary frame.

For illustrative purposes, assume that the DRA logic 63 defines the framing structure shown by FIG. 6, where $T_{cycle}$ is the period of a frame, $T_{DS}$ is the period of the downstream block within the frame, $T_{US}$ is the period of the upstream block within the frame, M is the total number of downstream timeslots in the frame, N is the total number of upstream timeslots in the frame, and $T_{TS}$ is the period of a single timeslot. As shown by FIG. 6, the exemplary frame has a sequence of M downstream timeslots followed by an ST period, then a sequence of N upstream timeslots followed by another ST period. As noted above, the respective sizes of the downstream and upstream blocks may change from frame-to-frame depending on traffic demand. That is, the values of N and M may change over time.

Figure 7:
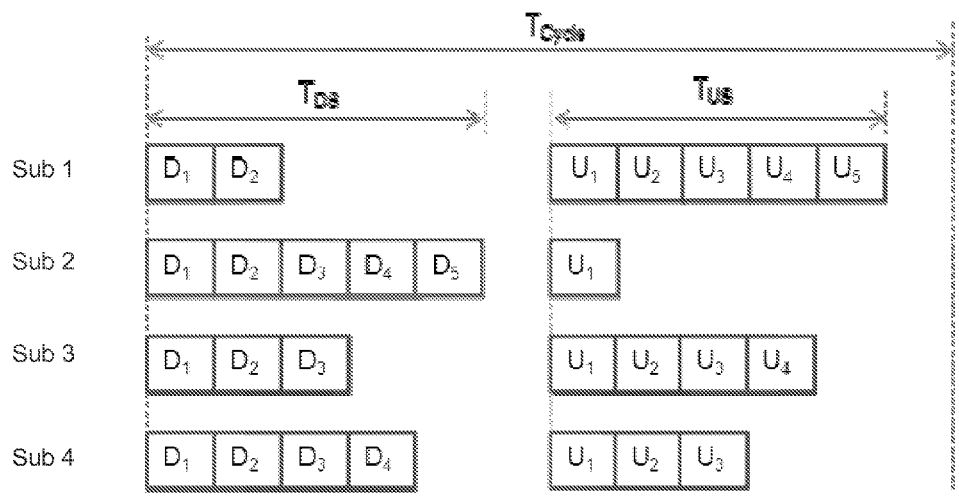
FIG. 7 is a block diagram illustrating an exemplary timeslot allocation for four subscribers.

As noted above, the transceivers 22 and 52 are synchronized such that the downstream blocks and the upstream blocks respectively overlap for all subscriber lines 39. This is shown in an example depicted by FIG. 7 for four subscribers or ports (1-4), where there are 5 downstream timeslots per frame and 5 upstream timeslots per frame. All of the downstream timeslots overlap in time, and all of the upstream timeslots overlap in time. Note that some of the timeslots are inactive either because there is no data to send in the timeslot or because it is desirable to prevent data from being transmitted in the timeslot in order to satisfy a constraint, such as a power dissipation limit.

Once the DRA logic 52 determines the power limit for a given frame, the DRA logic 52 distribute the available power for the frame among subscribers according to a desired control algorithm. In one exemplary embodiment, such control algorithm is based on predefined weights respectively assigned to the subscribers, as indicated by the control parameters 88 (FIG. 4). As an example, assume that there are four subscribers (1-4) where each subscriber is serviced by a single respective subscriber line 39. Also, assume that (1) all four subscribers are weighted equally, (2) there are five downstream timeslots for each subscriber in the downstream block, (3) there are five upstream timeslots for each subscriber in the upstream block, (4) the DRA logic 63 has determined that, in order to satisfy the specified power constraint, a given frame is to be allocated 20 active timeslots in either the upstream or downstream directions, (5) each transceiver 22 and 52 has more than 5 timeslots of data to transmit across the subscriber lines 39, and (6) there is currently a greater backlog of traffic queued for the downstream relative to the traffic queued for upstream. For simplicity of illustration, it is assumed that the power dissipated by the service unit 15 for an active downstream timeslot is the same as the power dissipated by the service unit 15 for an active upstream timeslot.

Figure 8:
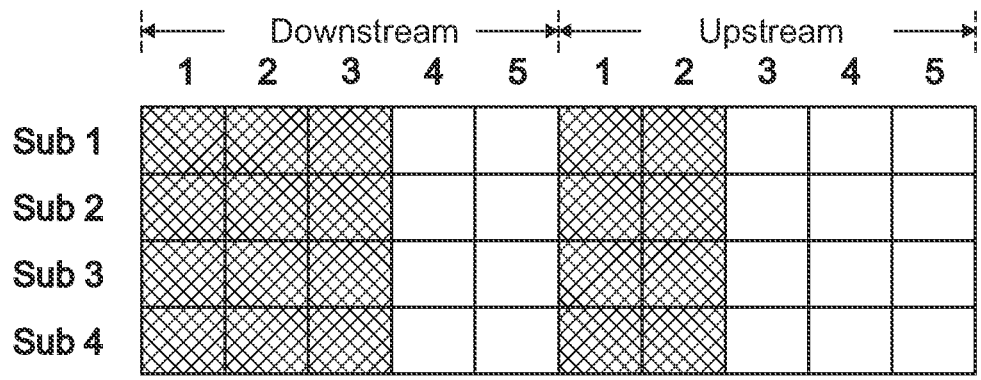
FIG. 8 is a block diagram illustrating an exemplary timeslot allocation for four subscribers in which each subscriber is assigned equal weight.

FIG. 8 shows an exemplary timeslot allocation defined by the DRA logic 63 for the instant example in which active timeslots are shaded and empty timeslots are not shaded. Note that FIGS. 8-10 do not shown TS periods for simplicity of illustration, but TS periods are preferably included, as shown by FIG. 6. As can be seen by viewing FIG. 8, each transceiver 52 is allocated the same number (i.e., three) of active downstream timeslots and the same number (i.e., two) of active upstream timeslots. Note that a greater number of active timeslots are allocated to the downstream direction relative to the upstream direction. In other frames, such as when a greater backlog of traffic exists for the upstream direction, a greater number of active timeslots may be allocated to the upstream direction relative to the downstream direction, if desired.

Figure 9:
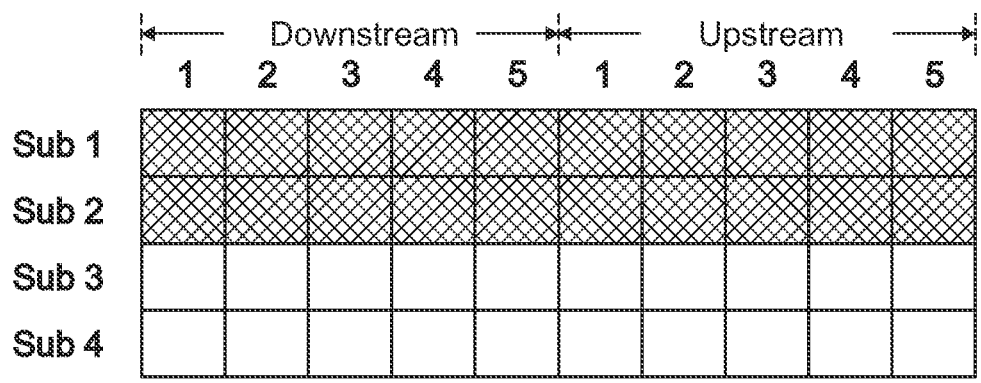
FIG. 9 is a block diagram illustrating an exemplary timeslot allocation for four subscribers when two of the subscribers are idle.

FIG. 9 shows another exemplary timeslot allocation based on the same assumptions except that two subscribers (i.e., subscribers 3 and 4) are idle. That is, there is no queued data for transmission across two of the subscriber lines 39. In such case, no power and, therefore, no active timeslots are allocated for subscribers 3 and 4, and the power that would otherwise have been allocated for subscribers 3 and 4 is instead distributed across subscribers 1 and 2 equally such that all of the timeslots for subscribers 1 and 2 are active.

Figure 10:
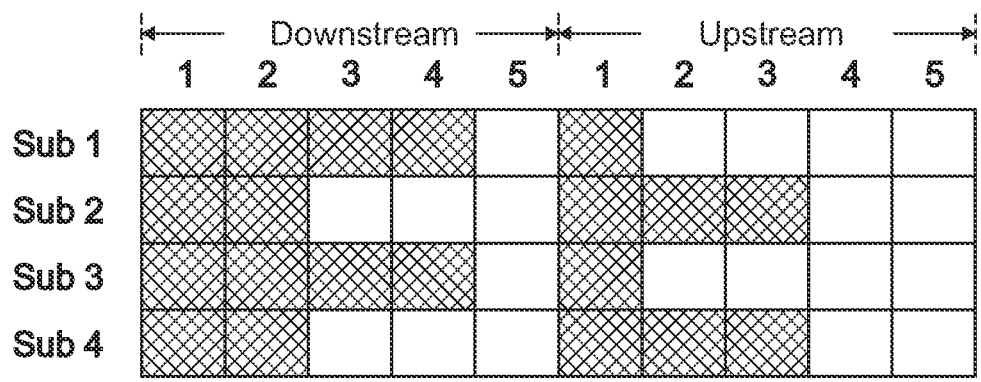
FIG. 10 is a block diagram illustrating an exemplary timeslot allocation for four subscribers.

FIG. 10 shows another exemplary timeslot allocation based on the same assumptions as for FIG. 8 except that each of the subscribers 2 and 4 has sufficient data queued in the downstream direction to occupy only two timeslots and each of the subscribers 1 and 3 has sufficient data queued in the upstream direction to occupy only one timeslot. In such case, one less downstream timeslot is assigned to each subscriber 2 and 4, thereby providing two additional downstream timeslots (relative to FIG. 8) that are allocated equally among subscribers 1 and 3. Additionally, one less upstream timeslot is assigned to each subscriber 2 and 4, thereby providing two additional downstream timeslots (relative to FIG. 8) that are allocated equally among subscribers 1 and 3. An exemplary algorithm for limiting power dissipation can be described mathematically, as illustrated below. In this regard, let:

N=number of subscribers connected to the DP $N_{d,i,j}$=the number of downstream frames allocated to subscriber "i" during frame "j" (actual)

$N_{u,i,j}$=the number of upstream frames allocated to subscriber "i" during frame "j" (actual)

$K_{d,i}$=value representing the power per downstream frame for subscriber "i" (vendor-specified)

$K_{u,i}$=value representing the power per upstream frame for subscriber "i" (vendor-specified)

P=value representing the maximum average power per frame (computed)

$A_i$=value representing the actual average power per frame for subscriber "i" (computed)

K=number of frames over which average computed (provisioned)

F=current frame index (increments by one every frame)

C=power associated with common circuitry in DP (vendor-specified)

An exemplary power conservation criterion is:

$$P \geq C + \frac{1}{K}\sum_{i=1}^{N} \sum_{j=F-K+1}^{F} K_{d,i}N_{d,i,j} + K_{u,i}N_{u,i,j} \quad (1)$$

In other words, over all N users and over the K most recent frames, allocate timeslots such that the average power per frame is less than or equal to P. In order for this equation to be enforced, the DP preferably has knowledge of the allocated timeslots and has control over at least some of the timeslot allocations. The value $K_{d,i}$ and $K_{u,i}$ include the subscriber index because subscribers on longer loops or with other impairments will likely require more power per timeslot than subscribers on "easier" loops.

The power conservation criterion can be rewritten as:

$$P \geq C + \frac{1}{K}\sum_{i=1}^{N} A_i \quad (2)$$

where $$A_i = \frac{1}{K}\sum_{j=F-K+1}^{F} K_{d,i}N_{d,i,j} + K_{u,i}N_{u,i,j} \quad (3)$$

If there is power "congestion" (in other words, if filling the entire frame for all subscribers with timeslots will cause the value of P to be exceeded), then there should be a "fair" way of allocating timeslots to users.

An exemplary fairness algorithm is to assign each subscriber a "weight", and allocate the power dissipation such that the ratio of allocated power is proportional to the weight assigned. In other words, for weight $w_i$ assigned to subscriber "i", $$\frac{A_i}{w_i} = \frac{A_j}{w_j} \quad (4)$$

for subscribers "i" and "j" with data to send.

These weights can be assigned to a given subscriber, for example, according to a service level agreement.

As indicated above, for any given frame, it is possible for a particular subscriber to be allocated more (or less) power and, hence, a higher (or lower) number of active timeslots than what is indicated by its relative weighting. For instance, if all subscribers are weighted equally, it is possible for a particular downstream transceiver 52 to be allocated more or fewer active downstream timeslots than another downstream transceiver 52 for a given frame based on traffic demand. In addition, the power dissipated by one transceiver 52 for transmitting (or receiving) data for a single timeslot may be different than the power dissipated by another transceiver 52 due to a variety of reasons, such as differences in line conditions. Thus, even if each subscriber is assigned the same timeslot allocation as another subscriber for a given frame, it is possible for the transceiver 52 servicing one subscriber to dissipate an amount of power that is different than that dissipated by the transceiver 52 servicing another subscriber during the frame.

In one exemplary embodiment, the DRA logic 63 is configured to track the power dissipation per subscriber over a window of time spanning multiple frames and attempt to enforce the weighting indicated by the control parameters 88 (FIG. 4) over time such that the total power dissipation per transceiver 52 over the entire window is close to the transceiver's proportion indicated by its assigned weight. Thus, in making timeslot allocation decisions for a given frame, the DRA logic 63 takes into account power dissipation totals from previous frames in order to compensate for disproportionate power dissipation (relative to the weighting indicated by the control parameters 88) that occurred previously in the window due to variations in traffic demand over time or otherwise.

In this regard, in making timeslot allocation decisions for a given frame, the DRA logic 63 is configured to sum, for each transceiver 52, the total amount of power dissipated for the previous frames in the window. The DRA logic 63 is further configured to compare the sums to the weighting indicated by the control parameters 88 (FIG. 4) and to assign timeslots for the current frame based on the comparison. As an example, assume that the weighting is equal for all subscribers but that subscriber 1 has previously dissipated more power during the window relative to subscriber 2. Also assume that both subscribers 1 and 2 have more data queued for transmission than is possible to transmit during the current frame. In such case, the DRA logic 63 may be configured to allocate more power and, hence, assign more timeslots to subscriber 2 than to subscriber 1 in order to compensate for the fact that subscriber 1 has previously dissipated disproportionately more power during the window.

Figure 11:
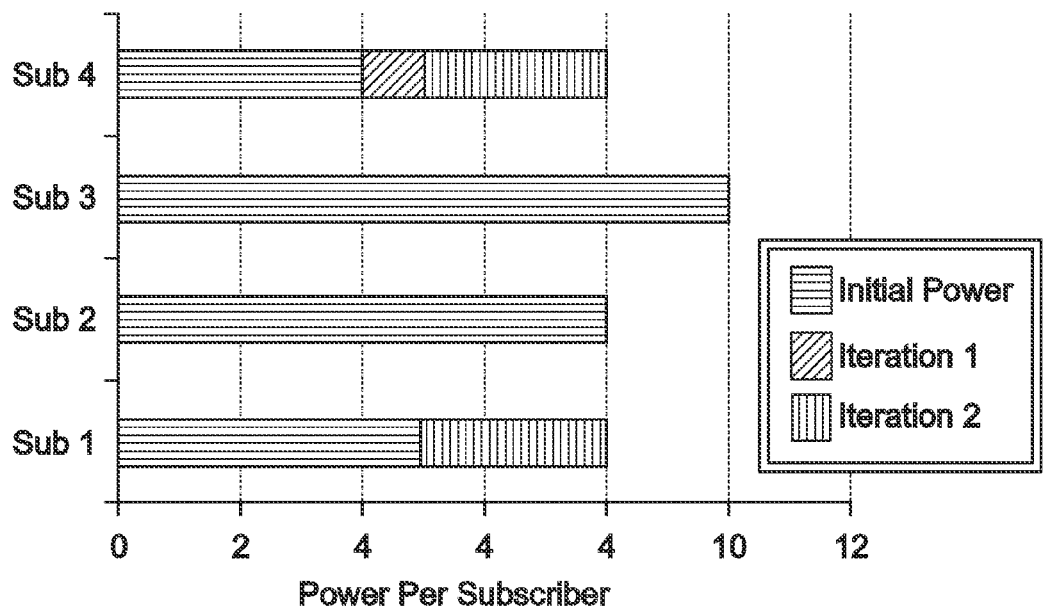
FIG. 11 is graph showing power per subscriber for various iterations of an exemplary power distribution algorithm.

To better illustrate the foregoing, assume that subscribers 1-4 are weighted equally and that the power previously dissipated by the transceivers 52 of the four subscribers over a window of K frames is indicated by FIG. 11. Specifically, over the past K−1 frames, the transceiver 52 servicing subscriber 1 has dissipated about 5 units of power, the transceiver 52 servicing subscriber 2 has dissipated about 8 units of power, the transceiver 52 servicing subscriber 3 has dissipated about 10 units of power (i.e., twice as much as subscriber 1), and the transceiver 52 servicing subscriber 4 has dissipated about 4 units of power. The power sum over all four subscribers is 27 units (i.e., 4+10+8+5). Assume further that the power limit for the entire window of K frames is 34. Thus, there are 7 available power units to be fairly distributed among the four subscribers. Also, assume that all four subscribers have queued data to send both upstream and downstream such that there are no adjustments to the timeslot allocations based on traffic demand for the current example.

Assuming that the subscribers are weighted equally, the DRA logic 63 performs the power allocation by first effectively "pouring" power into or allocating power to the lowest power subscriber (i.e., subscriber 4 in this example) until this subscriber's power is even with the next lowest power subscriber (i.e., subscriber 1 in this example). This means 1 power unit is effectively "poured" into or allocated to subscriber 4. Once a power unit is allocated to a subscriber, the DRA logic 63 may be configured to allocate timeslots to this subscriber commensurate with the amount of additional power allocated, as will be described in more detail below.

This approach of allocating the power units to the lowest power subscribers is repeated until all subscribers are even or until all available power units are allocated. Thus, in the instant example, the next two lowest subscribers (i.e., subscribers 1 and 4 in this example) are equally allocated power units until they reach the next lowest power subscriber (i.e., subscriber 2 in this example). This means 3 power units are effectively "poured" into or allocated to each of the transceivers 52 servicing subscribers 1 and 4. At this point there are no more power units to allocate, and the power allocation process ends with subscriber 4 allocated 4 power units and subscriber 1 allocated 3 power units for the current frame. Accordingly, the total power dissipated over all K frames of the window is closer to the weighting assigned to all four subscribers relative to the total power dissipated over the K−1 previous frames. Specifically, the transceivers 52 servicing subscribers 1, 2, and 4 dissipate 8 units of power over the K frames, and the transceiver 52 servicing subscriber 3 dissipates 10 units of power. Further, for the current frame, the subscriber 1 is allocated a number of active timeslots (upstream and/or downstream) that cause the transceiver 52 servicing subscriber 1 to dissipate about (without exceeding) three units of power, and subscriber 4 is allocated a number of active timeslots (upstream and/or downstream) that cause the transceiver 52 servicing subscriber 4 to dissipate about (without exceeding) four units of power. No active timeslots are allocated to subscribers 2 and 3.

Note that the iterative process described above for allocating power units generally continues until the total power allocated over K frames reaches the power limit for the window. However, if a sufficient amount of power has been allocated to a given subscriber to transmit all of its queued data (i.e., data that is queued for transmission across the subscriber's line 39), then the power allocated to such subscriber is capped. In this regard, after allocating power to a subscriber during an iteration, the DRA logic 63 allocates a number of active downstream timeslots to such transceiver 52 servicing the subscriber and/or a number of active upstream timeslots to the CP transceiver 22 in communication with such transceiver 52 in order to utilize the additional power allocated to the subscriber. That is, if x amount of power is newly allocated to a transceiver 52 servicing a subscriber, then additional active timeslots (upstream and/or downstream) are allocated to such subscriber, thereby increasing the power dissipated by the subscriber's transceiver 52, such that the total power dissipated by the transceiver 52 in processing the additional active timeslots is close to but not exceeding x. If a point is reached where the allocated timeslots are sufficient to transmit all of the data queued for the subscriber, then no more timeslots are allocated to the subscriber for the current frame, and any remaining power that has been or would have been otherwise allocated to such subscriber by the power allocation algorithm may instead be allocated to other subscribers according to the techniques described above.

Similarly, if a point is reached where all timeslots in a frame for a given subscriber are active, no more power is allocated to such subscriber, and any remaining power that has been or would have been otherwise allocated to such subscriber by the power allocation algorithm may instead be allocated to other subscribers according to the techniques described above.

In one exemplary embodiment, the DRA logic 63 is generally configured to implement the power allocation algorithm described above, but the DRA logic 63 is configured to ensure that a required minimum number of downstream and upstream capacity is provided to each subscriber in every frame. To effectuate this, the DRA logic 63 first allocates the available power units evenly across all subscribers until a given subscriber's minimum requirement is fulfilled. Once the subscriber's minimum requirement is fulfilled, no further power units are allocated to such subscriber until the minimum requirements are fulfilled for all subscribers serviced by the unit 15. Once the minimum requirements for all subscribers are fulfilled, the DRA logic 63 is configured to allocate any remaining power units according to the algorithm previously described above.

If the subscribers are weighted differently, then the exemplary algorithm described above can be modified to accommodate the different weighting. As an example, assume that the power previously dissipated by the subscribers for the previous K−1 frames is the same as described above (i.e., 5, 8, 10, and 4 power units for subscribers 1, 2, 3, and 4, respectively). Also assume that subscribers 1, 2, 3, and 4 are assigned weights 2, 3, 4, and 1, respectively. Thus, according to the defined weighting, subscriber 1 is generally allocated twice as much power relative to subscriber 4, and subscriber 3 is generally allocated twice as much power as subscriber 1.

For illustrative purposes, $U_i$ and $W_i$ represent the unweighted and weighted power vectors at iteration "i", respectively. Initially, the DRA logic 63 divides the initial power values by their associated weights, yielding weighted powers of {2.5, 2.667, 2.5, 4} for subscribers {1, 2, 3, 4}, respectively. Thus, subscriber 3 goes from the largest unweighted power to the smallest weighted value. In the current example, $U_1$ is {5, 8, 10, 4} for subscribers {1, 2, 3, 4}, respectively, and $W_1$ is {$5/W_1$, $8/W_2$, $10/W_3$, $4/W_4$} or in other words {2.5, 2.667, 2.5, 4} for subscribers {1, 2, 3, 4}, respectively.

The distribution of power is performed by first effectively "pouring" power into or allocating power units to the lowest weighted power subscribers, which are subscribers 1 and 3 having weighted powers of 2.5 in this example, until the power for each of these subscribers is even with the next lowest weighted power subscriber (i.e., subscriber 2 having a weighted power of 2.667 in this example) or until all of the available power units are allocated. Once the powers for the lowest weighted power subscribers are even with the next lowest weighted power subscriber, the weights are adjusted to reflect the additional power allocated to the lowest weighted power subscribers in the current iteration. Specifically, the weighted value for each of the lowest weighted power subscribers is increased by the difference of such subscriber's weighted value and the weighted value of the next lowest weighted power subscriber multiplied by the subscriber's original weighted value. Thus, $U_2$ is {5+(2.667−2.5)*$W_1$, 8, 10+(2.667−2.5)*$W_3$, 4} or in other words {2.667, 2.667, 2.667, 4} for subscribers {1, 2, 3, 4}, respectively, and $W_2$ is {$6.666/W_1$, $10/W_2$, $13.333/W_3$, $4/W_4$} or in other words {3.333, 3.333, 3.333, 4} for subscribers {1, 2, 3, 4}, respectively.

Figure 12:
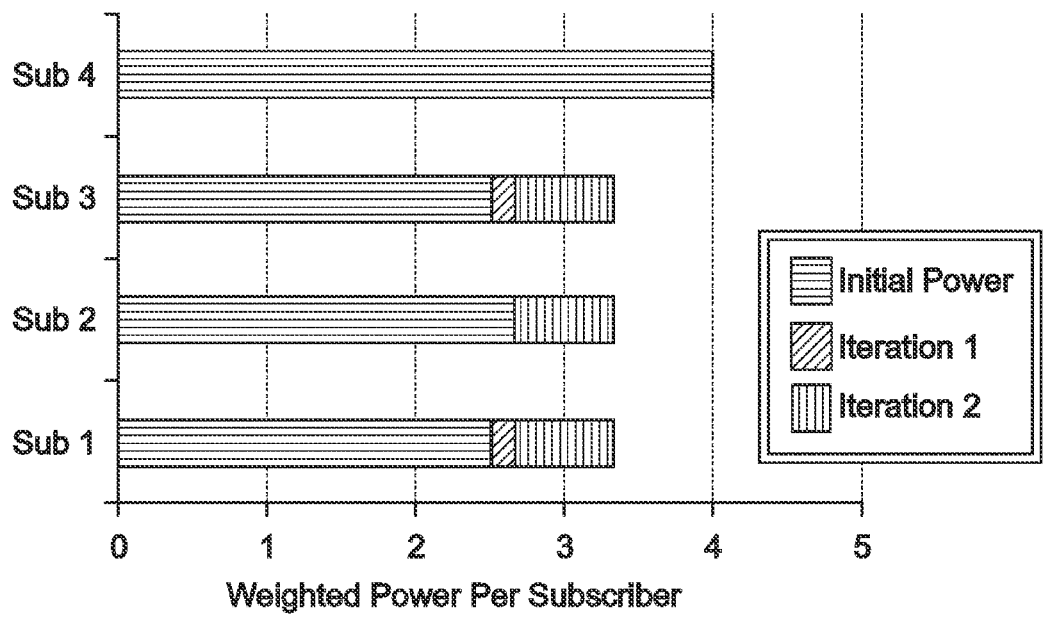
FIG. 12 is graph showing weighted power per subscriber for various iterations of an exemplary power distribution algorithm.
Figure 13:
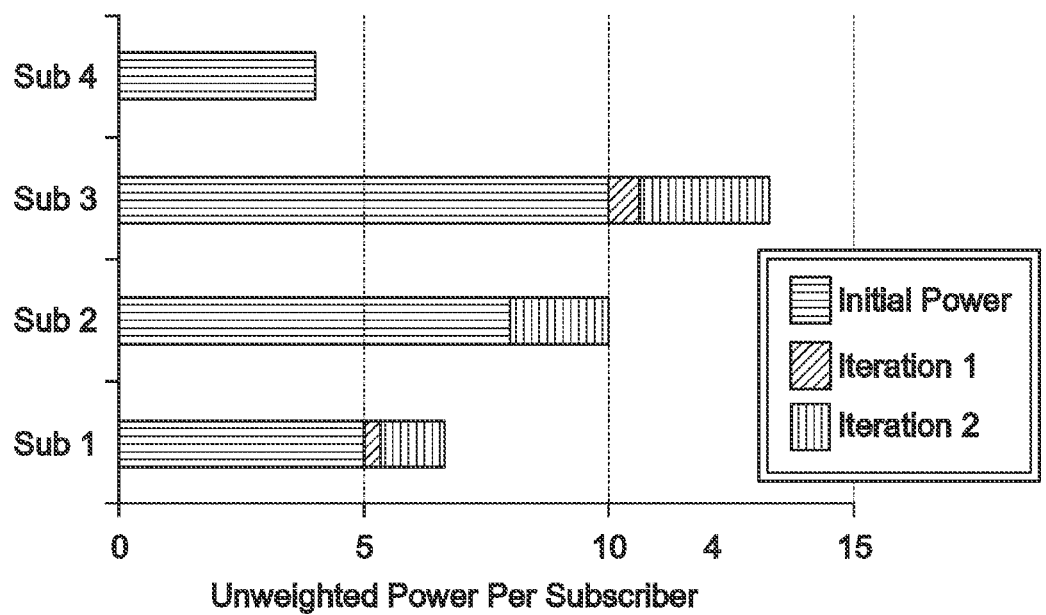
FIG. 13 is graph showing unweighted power per subscriber for various iterations of an exemplary power distribution algorithm.

For the next iteration, power is effectively "poured" into or allocated to the lowest weighted power subscribers, which are subscribers 1, 2, and 3 having weighted powers of 2.667 for the current iteration in this example, until the power for each of these subscribers is even with the next lowest weighted power subscriber (i.e., subscriber 4 having a weighted power of 4 in this example) or until all of the available power units are allocated. In the current example, the maximum number of power units to be allocated across all K frames is 34, and there are only 7 available power units to allocate for the current frame. Thus, the process ends before subscribers 1-3 reach the weighted power of subscriber 4. In this example, the resulting weighted power is {3.333, 3.333, 3.333, 4} for subscribers {1, 2, 3, 4}, respectively. FIG. 12 shows the iterations of the weighted power, and FIG. 13 shows the corresponding iterations of the unweighted power. Note that in FIG. 13, subscriber 3 starts with the highest initial power and is increased the most because it has the highest weight. Note also that subscriber 4 is not allocated any additional power and therefore would not transfer any data during the current frame.

It should be further noted that, in allocating timeslots to a given subscriber, there are several considerations that can be taken into account by the DRA logic 63, particularly when the subscriber is allocated an insufficient amount of power for all of its otherwise available timeslots in a frame. In this regard, in allocating one or more timeslots to a given subscriber, the DRA logic 63 is configured to select either upstream or downstream based on the subscriber's current traffic demand.

For example, if there is data to transmit in only one direction for a given subscriber, then the DRA logic 63 may allocate to the subscriber active timeslots only in such direction. As an example, if a given subscriber is allocated enough power to transmit three timeslots in the upstream direction when there is no data to transmit in the downstream direction, then the DRA logic 63 may be configured to allocate three active upstream timeslots to the subscriber and no active downstream timeslots to the subscriber.

If there is data to transmit in both directions, then the DRA logic 63 can be configured to allocate power between upstream and downstream in various ways. In one exemplary embodiment, the DRA logic 63 is configured to allocate power between upstream and downstream timeslots based on (e.g., in proportion to) the number of possible upstream and downstream timeslots in the current frame. As an example, if there are twice as many downstream timeslots in the downstream block as compared to the number of upstream timeslots in the upstream block, then the DRA logic 63 may be configured to allocate to the subscriber twice as many active downstream timeslots relative to the number of active upstream timeslots allocated to the subscriber.

In another embodiment, the DRA logic 63 is configured to allocate power between upstream and downstream timeslots based on (e.g., in proportion to) the amount of data queued for transmission in the downstream direction relative to the amount of data queued for transmission in the upstream direction. For example, if there is twice as much data queued for transmission in the downstream direction relative to the amount of data queued for transmission in the upstream direction, then the DRA logic 63 may be configured to allocate to the subscriber twice as many active downstream timeslots relative to the number of active upstream timeslots allocated to the subscriber. In other embodiments, other techniques and/or some combination of the aforementioned techniques may be used to allocate power between the upstream and downstream timeslots. In all cases, the required sum power $K_{d,i}*N_{d,i,j}+K_{u,j}*N_{u,i,j}$ for downstream and upstream should be equal to or smaller than the power allocated to the $i^{th}$ subscriber in the $j^{th}$ frame.

For several of the exemplary embodiments described above, it is assumed that the DRA logic 63 at the service unit 15 is capable of communicating control information with the CP transceivers 22 and assigning the upstream timeslots. However, for some embodiments, it is possible for each CP transceiver 22 to implement DRA logic for allocating active upstream timeslots for the transceiver 22. In one exemplary embodiment, a CP transceiver 22 uses similar criterion as is described above as being use by the DRA logic 63 at the service unit 15 in order to assign active upstream timeslots. Specifically, each CP transceiver 22 is provisioned with a maximum upstream average power per frame, and the criterion is:

$$P_{u,i} \geq \frac{1}{K} \sum_{j=F-K+1}^{F} K_{u,i} N_{u,i,j}$$

This is sub-optimal to the case where both the upstream and downstream allocation are controlled by the DRA logic 63 at the service unit 15, and it generally does not take advantage of other CP transceivers 22 that are not using all of their allocated power. An advantage is that it does not request the service unit 15 to have knowledge of upstream traffic load. It does control the average power while allowing the data transfer to peak above the average load.

It should be emphasized that the embodiments described herein are exemplary, and various changes and modifications to the embodiments illustrated herein are possible. The power optimization techniques described herein may be used with any network device having transceivers for communicating data across a plurality of subscriber lines.

Now, therefore, the following is claimed:

1. A network service unit, comprising:
    a plurality of transceivers respectively coupled to a plurality of subscriber lines;
    an interface coupled to a network connection and configured to receive a data stream from the network connection;
    a multiplexer configured to multiplex the data stream and to transmit packets of the data stream to the plurality of transceivers; and
    dynamic rate allocation (DRA) logic configured to allocate power among the plurality of transceivers, based on a specified power limit for an average power dissipated by at least the plurality of transceivers, such that (1) an average power dissipated by at least the plurality of transceivers during a time interval is below the specified power limit and (2) a peak power dissipated by the at least the plurality of transceivers is permitted to exceed the specified power limit during the time interval, the DRA logic further configured to allocate, to the plurality of transceivers, timeslots of data frames communicated across the subscriber lines based on the allocated power.

2. The network service unit of claim 1, further comprising a temperature sensor, wherein the specified power limit is based on a temperature sensed by the temperature sensor.

3. The network service unit of claim 1, wherein the DRA logic is configured to determine a value indicative of an amount of power available for powering components of the network service unit, and wherein the specified power limit is based on the value.

4. The network service unit of claim 1, further comprising memory for storing data indicating weights assigned to subscribers serviced by the network service unit, wherein the DRA logic is configured to allocate the power among the plurality of transceivers based on the weights.

5. The network service unit of claim 1, wherein the DRA logic is configured to allocate the power among the plurality of transceivers based on a value indicative of an amount of traffic queued for transmission across at least one of the subscriber lines.

6. The network service unit of claim 1, wherein the DRA logic is configured to define a media access plan (MAP) for informing at least one of the transceivers of upstream time slots allocated to the at least one transceiver, and wherein the DRA logic is configured to transmit the MAP to the at least one transceiver.

7. The network service unit of claim 1, wherein the DRA logic is configured to determine a value indicative of the average power dissipated by at least the plurality of transceivers during the time interval and perform a comparison between the value and the specified power limit, and wherein the DRA logic is configured to allocate the timeslots based on the comparison.

8. A network service unit, comprising:
    a plurality of transceivers respectively coupled to a plurality of subscriber lines and configured to communicate data frames across the subscriber lines, the data frames having timeslots;
    an interface coupled to a network connection and configured to receive a data stream from the network connection;

a multiplexer configured to multiplex the data stream and to transmit packets of the data stream to the plurality of transceivers; and dynamic rate allocation (DRA) logic configured to ensure that an average power dissipated by at least the plurality of transceivers during a time interval is below the specified power limit by controlling, based on the specified power limit, allocation of the timeslots to the plurality of transceivers, the DRA logic further configured to control the allocation of the timeslots such that a peak power dissipated by the at least the plurality of transceivers is permitted to exceed the specified power limit during the time interval.

9. The network service unit of claim 8, further comprising a temperature sensor, wherein the specified power limit is based on a temperature sensed by the temperature sensor.

10. The network service unit of claim 8, wherein the DRA logic is configured to determine a value indicative of an amount of power available for powering components of the network service unit, and wherein the specified power limit is based on the value.

11. The network service unit of claim 8, further comprising memory for storing data indicating weights assigned to subscribers serviced by the network service unit, wherein the DRA logic is configured to allocate the power among the plurality of transceivers based on the weights.

12. The network service unit of claim 8, wherein the DRA logic is configured to allocate the power among the plurality of transceivers based on a value indicative of an amount of traffic queued for transmission across at least one of the subscriber lines.

13. The network service unit of claim 8, wherein the DRA logic is configured to define a media access plan (MAP) for informing at least one of the transceivers of upstream time slots allocated to the at least one transceiver, and wherein the DRA logic is configured to transmit the MAP to the at least one transceiver.

14. A network service unit, comprising:
a plurality of transceivers respectively coupled to a plurality of subscriber lines and configured to communicate data frames across the subscriber lines, the data frames having timeslots;
an interface coupled to a network connection and configured to receive a data stream from the network connection;
a multiplexer configured to multiplex the data stream and to transmit packets of the data stream to the plurality of transceivers;
a temperature sensor; and
dynamic rate allocation (DRA) logic configured to modify a specified power limit based on a temperature sensed by the temperature sensor, the DRA logic configured to ensure, based on the specified power limit, that an average power dissipated by at least the plurality of transceivers during a time interval is below the specified power limit by controlling an allocation of the timeslots to the transceivers, the logic further configured to control the allocation of the timeslots such that a peak power dissipated by the at least the plurality of transceivers is permitted to exceed the specified power limit during the time interval.

15. The network service unit of claim 14, wherein the DRA logic is configured to define a media access plan (MAP) for informing at least one of the transceivers of upstream time slots allocated to the at least one transceiver, and wherein the DRA logic is configured to transmit the MAP to the at least one transceiver.

16. A method, comprising:
receiving data at a network service unit, the network service unit coupled to at least one network connection and a plurality of subscriber lines;
transmitting the data from a plurality of transceivers at the network service unit across the plurality of subscriber lines;
ensuring that an average power dissipated by at least the plurality of transceivers during a time interval is below a specified power limit for the average power dissipated, wherein the ensuring comprises allocating, to the plurality of transceivers, timeslots of frames communicated across the subscriber lines based on the specified power limit, and wherein the allocating is performed such that a peak power dissipated by the at least the plurality of transceivers is permitted to exceed the specified power limit during the time interval.

17. The method of claim 16, further comprising sensing a temperature at the network service unit, wherein the specified power limit is based on the sensing.

18. The method of claim 16, further comprising determining a value indicative of an amount of power available for powering components of the network service unit, wherein the specified power limit is based on the value.

19. The method of claim 16, further comprising storing, in memory, data indicating weights assigned to subscribers serviced by the network service unit, wherein the allocating is based on the weights.

20. The method of claim 16, further comprising determining a value indicative of an amount of traffic queued for transmission across at least one of the subscriber lines, wherein the allocating is based on the value.

21. The method of claim 16, wherein the allocating comprises:
defining a media access plan (MAP) indicating upstream time slots allocated to at least one of the transceivers; and
transmitting the MAP from the network service unit to the at least one transceiver.

* * * * *